United States Patent Office 3,753,979
Patented Aug. 21, 1973

3,753,979
SUBSTITUTED 1,2α-METHYLENE-6,7α-HALO-METHYLENE-20-SPIROX-4-EN-3-ONES OR 3-OLS AND ACYL ESTERS THEREOF
Glen E. Arth, Cranford, and Gary H. Rasmusson, Watchung, N.J., assignors to Merck Co., Inc., Rahway, N.J.
No Drawing. Continuation-in-part of application Ser. No. 21,183, Mar. 19, 1970, which is a continuation-in-part of application Ser. No. 824,672, May 14, 1969, both now abandoned. This application Dec. 6, 1971, Ser. No. 205,304
Int. Cl. C07c *173/06*
U.S. Cl. 260—239.55 R                 5 Claims

ABSTRACT OF THE DISCLOSURE 1,2α-methylene-2-spirox-4-en-3-ones (or 3,21-diones) and the corresponding 3-ols and their acyl ester derivatives are provided having 6,7α-halomethylene substituent; the compounds exhibit antiandrogenic activity.

---

This application is a continuation-in-part application of copending U.S. Ser. No. 21,183 filed Mar. 19, 1970, now abandoned, which in turn is a continuation-in-part application of U.S. Ser. No. 824,672 filed May 14, 1969, now abandoned.

The present invention relates to novel compounds of the following formulae:

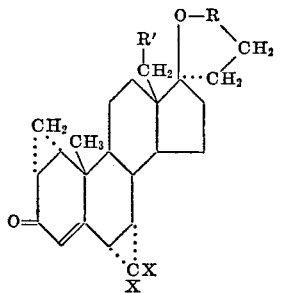

(I)

wherein X represents chloro or fluoro and may be the same or different, R' represents methyl or hydrogen, and R represents methylene (—$CH_2$—) or keto (>C=O).

In addition, this invention relates to novel compounds of Formula I in which the 3-keto group is reduced to the 3-ξ-ol and further is acylated to the 3-ξ-acyl ester steroid. Preferably, the alkanoyl (C=1–9) esters are prepared of the 3-ξ-ol steroids.

Other acyl esters other than the alkanoyl esters can be desirably employed. For instance, compounds of the following formula:

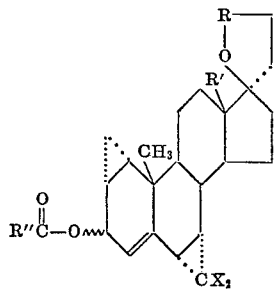

wherein R'' is alkyl having 1–9 carbon atoms, cycloalkyl having 3–6 carbon atoms; cycloalkyl-substituted alkyl, the latter having 1–3 carbon atoms; carboxyalkyl; phenylalkyl; phenylalkoxyalkyl; alkoxyalkyl; phenylalkylene; naphthylalkyl; a heterocyclic ring having 5–6 members and 1–2 heteroatoms, the latter being S or O; heterocyclicalkyl, the heterocyclic group being as defined above; phenoxyalkyl; and substituted phenoxyalkyl, the substituents being halo or loweralkyl. When the terms "alkyl" or "alkoxy" or "alkylene" or the like are employed, it is meant to describe a carbon chain having 1–6 carbon atoms. Some specific R'' groups which can be mentioned are (trimethyl)methyl; hexyl; (cyclopentyl)ethyl; cyclohexyl, (cyclohexyl)methyl, carboxyethyl; (cyclohexyl)ethyl, (phenyl)methyl, (phenyl)ethyl, (phenyl)ethyloxymethyl, ethyloxyethyl, (naphthyl)methyl, phenylethyleneyl, 2-furyl, 3-furyl, 2-thienyl, (2-thienyl)methyl, (2-thienyl)ethyl, phenoxymethyl; 2-chlorophenoxymethyl; 4-chlorophenoxymethyl; 2,4-dichlorophenoxymethyl; 4-methylphenoxymethyl; 4-fluorophenoxymethyl; or 4-t-butylphenoxymethyl.

The novel compounds of this invention are specific androgen antagonists which are useful as therapeutic agents to treat hyperandrogenic disorders. They are particularly useful in the treatment of acne resulting from hyperandrogenicity. They can be administered orally, subcutaneously, or topically in suitable formulations. For example, a hydrophilic ointment suitable for topical application containing 5% by weight of 1,2α-methylene-6,7α-difluoromethylene-20-spirox-4-en-3-one in a dipropylene glycol and pollethylene glycol carrier can be prepared by mixing the warm components and cooling. Ointments can be prepared having 0.5–20% by weight of the steroid compound.

A cream-type preparation can also be prepared as a carrier for the active ingredient. A polyethylene glycol (MW=200–300) containing 6% of 1,2α-methylene-6,7α-difluoromethylene-20-spirox-4,21-dien-3-one is mixed together with benzyl alcohol, benzylbenzoate, and sodium stearate. A translucent viscous cream results. Creams of this nature can be prepared having 3–20% by weight of the desired steroid.

The active compounds of this invention can also be mixed into pharmaceutical compositions as solid ointment sticks molded into the desired shape, or lotions. The latter can be oil-in-water and esters which are non-toxic and generally used in the art.

The novel compounds of the present invention are prepared according to the following processes (Flow Sheet I):

FLOW SHEET I

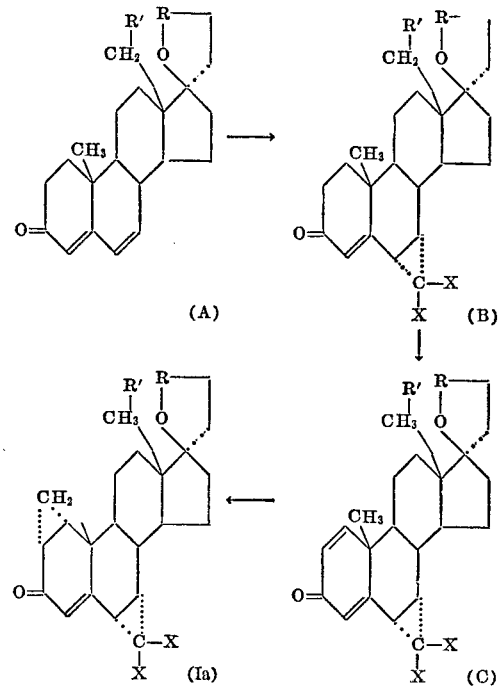

The starting material is 20-spirox-4,6-dien-3-one, Compound A. This material can be prepared following the procedure disclosed in U.S. Pat. 3,254,074. It is utilized in the process resulting in Compound Ia.

This process involves, first, the halomethylene substitution at the 6:7 double bond of Compound A, and then the introduction of a 1:2 double bond in Ring A of the resultant steroid. The 1:2 double bond can then be substituted with a methylene group to form Compound Ia.

In the preparation of Compound Ia, (1,2α-methylene-6,7α-dihalomethylene - 20 - spirox - 4 - en-3-one), Compound A, (20-spirox-4,6-diene-3-one) is reacted in an organic solvent with a trihalo-substituted alkali metal acetate of the formula

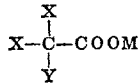

wherein M can be sodium, potassium, or the like, Y is chloro, and X has the same meaning in that of Formula I. The molar ratio of Compound A to the halo-acetate is about 1–30 and preferably a ten-fold excess of the halo-acetate is used. The temperature of the reaction is 150–250° C., and preferably at 180–225° C. The reaction takes place in a 1–5 hour period and generally within about 2–3 hours.

The organic solvent can be any solvent which is nonreactive in the presence of the two main reactants. Preferably, it is freshly distilled, or at least free from dissolved oxygen impurities. Suitable solvents include diethylene glycol dimethylether and triethylene glycol dimethylether.

The particular trihalo alkalimetal acetate employed depends on the identity of the substituents X in the 6,7α-halomethylene group. Using the preferred trihalo sodium acetate as an example, if 6,7-α-difluoromethylene is desired, then chlorodifluorosodium acetate is used. When 6,7α-dichloromethylene is desired, trichlorosodium acetate is suitable. When a 6,7α-chlorofluoromethylene is the desired product, then dichlorofluorosodium acetate can be used.

The compound produced by the reaction of (A) with the halogenated sodium acetate is Compound B, 6,7α-dihalomethylene-4-en-3-one. This compound is purified by conventional methods, and can then be reacted with from an equivalent molar amount to about a 1-molar excess of 2,3-dichloro-5,6-dicyanobenzoquinone in an inert organic solvent such as benzene, xylene, or toluene are suitable. After mixing for a brief period, the mixture is refluxed for from 1–8 hours. After the reaction is complete, the hydroquinone byproduct resulting from the reduction of the quinone is removed from the solution by filtration. The product, Compound C, (6,7α-dihalomethylene-20-spirox-1,4-dien-3-one) can be purified by chromatography over a silica gel and eluted with an appropriate organic solvent such as ether and benzene.

After purification Compound C is added to a dimethylsulfoxide solution of freshly prepared Corey reagent, dimethyl sulfoxonium methylid, or [CH$_2$=SO(CH$_3$)$_2$]. The Corey reagent is employed in about a 5-fold molar excess, although the molar ratio of Compound C to the Corey reagent can be 1:1–5. The mixture is reacted at ambient temperature for 3–24 hours, and then quenched by the addition of water. The product, 1,2α-methylene-6,7α - dihalomethylene-20-spirox-4-en-3-one (Compound Ia), precipitates and can be purified using conventional techniques.

It is noted that a second process can be used to prepare the compounds of Formula Ia. See Flow Sheet 2 infra. We have found that this alternate process is particularly valuable when the 1,2α-methylene-6,7α-dichloromethylene-20-spirox-4-en-3-one compound is desired. Starting with Compound A, the keto group at position-3 is reduced to a hydroxy group (Compound F) using sodium borohydride, lithium-tri-t-butoxy aluminum hydride or lithium aluminum hydride. This hydroxy group is then acylated to protect it from further reaction. One acylation process uses acetic anhydride in pyridine to prepare the 3-acetoxy derivative (Compound G). This latter compound is then reacted with phenyltrichloromethylmercury, which results in the addition of the 6,7α-dichloromethylene group (Compound H). The acyl group is then removed by hydrolysis (Compound J). Suitable hydrolysis catalysts are potassium carbonate or sodium hydroxide in methanol. The 3-hydroxy steroid is then oxidized to the 3-keto substituent. The compound thus prepared is 6,7α-dichloromethylene-20-spirox-4-en-3-one (Compound B). This compound can then be treated with dichlorodicyanobenzoquinone to form 6,7α-dichloromethylene-20-spirox-1,4-dien-3-one; and the latter reacted with dimethyl sulfoxonium methylid to prepare 1,2α-methylene-6,7α-dichloromethylene-20-spirox-4-en-3-one. It is obvious that the 6,7α-chlorofluoro and difluoromethylene derivatives could also be prepared using the suitable phenyltrihalomethylmercury reactant.

FLOW SHEET 2

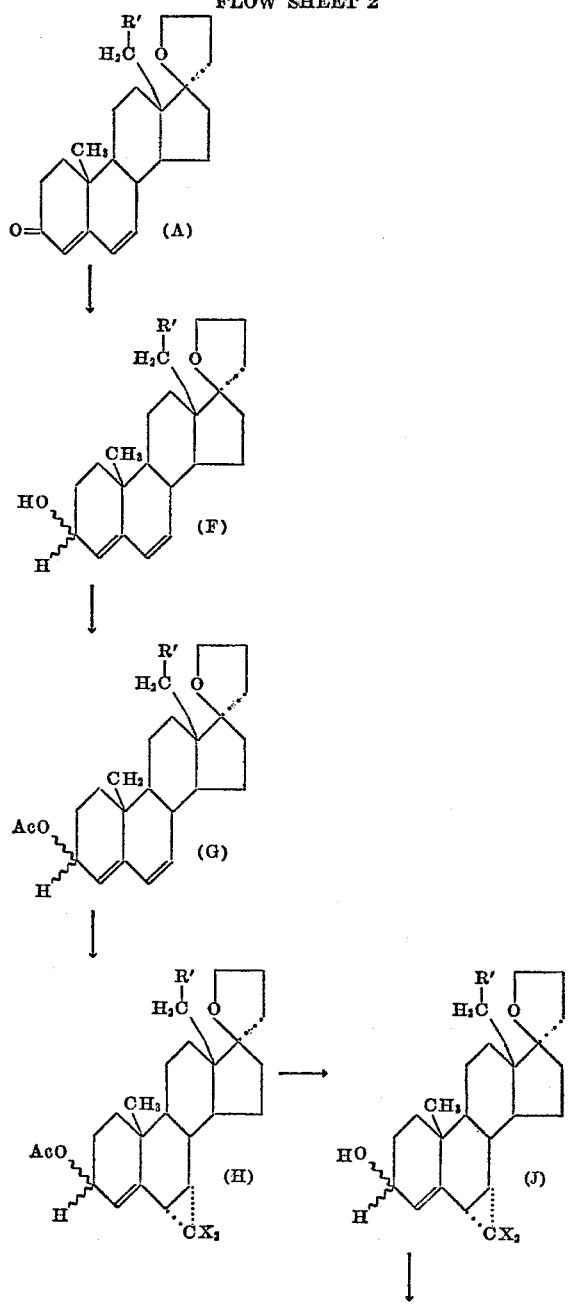

The Compound N can then be treated with dichlorodicyanobenzoquinone to form a double bond at 1–2 (Compound P); and the latter reacted with the Corey reagent producing the 1,2α-methylene steroid (Compound Q).

Compound Q is converted into Compound Ia by reaction of the former with an alkyl or arylsulfonyl chloride in pyridine solutions. Suitable reactants are toluenesulfonyl chloride or methanesulfonyl chloride. The alkyl or aryl sulfonyl chloride is added to the solution of Compound Q in pyridine solution and the solution, after flushing the container with nitrogen, is stirred for several hours while the temperature is maintained at about 0° C. After the reaction is complete, water and ice are added and the precipitate which forms is removed by extraction with a suitable solvent, such as ethyl acetate. The extract is immediately washed with cold aqueous dilute mineral acid, such as sulfuric acid, washed with water, washed with dilute aqueous sodium bicarbonate solution, dried over anhydrous magnesium sulfate and filtered. The solvent is removed by distillation under reduced pressure.

The residue is 1,2α-methylene-6,7α-difluoromethylene-20-spirox-4-en-3-one, Compound Ia.

Compound Q can also be converted into Compound Ib by reaction with a ring-closing oxidizing agent, e.g., chromic acid in acetone, to yield the desired 1,2α-methylene - 6,7α - difluoromethylene-20-spirox-4-en-3,21-dione, Compound Ib.

Following the preparation of Compound Ib, the spirolactone ring can be opened using a saponifying agent to yield the 1,2α-methylene-6,7α-difluoromethylene-17α-propionic acid-17β-hydroxyandrost-4 - en - 3 - one; the alkali metal salts, particularly the sodium and potassium salts, can be easily prepared therefrom. For instance, a suitable saponifying agent is sodium hydroxide which yields the sodium salt. The use of potassium hydroxide would prepare the potassium salt.

The novel 3- ξ-ols and acyl esters of Compound I can be prepared easily by reacting any of Compounds Ia or IB with a reducing agent, such as sodium borohydride, lithium tri-t-butoxy aluminum hydride or lithium aluminum hydride. This process is similar to the reduction of Compound A to Compound F, Flow Sheet 2. The 3-ol thusly prepared can then be acylated, for instance, with acetic anhydride in pyridine to acetylate. Preferably, the loweralkanoyl esters are prepared, having 1–9 carbon atoms in the ester moiety.

When other acyl esters are prepared, the suitable acid halide or acid chloride is employed in reaction with the 3-ol. For example, when R'' is one of the phenoxymethyl substituents as above defined, the appropriate phenoxyacetic anhydride or phenoxyacetyl halide, such as phenoxyacetyl chloride, is used. The other groups defined in R'' can be prepared in a similar fashion.

The following examples more fully illustrate this invention.

EXAMPLE 1

6,7α-difluoromethylene-20-spirox-4-en-3-one

One gram of 20-spiroxa-4,6-dien-3-one is dissolved in 5 cc. of triethylene glycol dimethylether (distilled from LiAlH₄). 6 g. of chlorodifluorosodium acetate (dried) in 50 cc. of dry triethyleneglycoldimethylether is added dropwise over a 2 hour period while keeping the reaction at 195–200° C. with constant stirring. The reaction mixture is poured over ice and extracted with ether. The ether extracts are washed with water and dried. The crude reaction product is eluted through 100:1 silica gel column, first with benzene then with increasing percentages of ether in benzene. The product, 6,7α-difluoromethylene-20-spirox-4-en-3-one is recrystallized from heptane, in 55% yield, and has a melting point of 130–132° C.

In the same manner, using dichlorofluorosodium acetate and trichlorosodium acetate, 6,7α-chlorofluoro-methylene-20-spirox-4-en-3-one and 6,7α-dichloromethylene-20-spirox-4-en-3-one are prepared.

EXAMPLE 2

6,7α-difluoromethylene-20-spiroxa-1,4-dien-3-one

A solution of 628 mg. of the 6,7α-difluoromethylene-20-spirox-4-en-3-one (prepared as in Example 1), in 7 ml. of benzene is treated with 497 mg. of 2,3-di-chloro-5,6-dicyanobenzoquinone with stirring at room temperature. The reaction mixture is brought to reflux and refluxed for 4 hours under nitrogen. The solution is filtered to remove most of the 2,3-dichloro-5,6-dicyanohydroquinone byproduct.

The product is purified by passing through a column packed with 100:1 silica gel. It is first eluted with benzene then with increased percentages of ether in benzene. The elution fractions of 5% ether-100% ether are combined. These fractions are again purified by passing through a column packed with 100:1 neutral alumina. The final elution is with 10% ether in benzene. The purified product, 382 mg. of 6,7α-difluoromethylene-20-spirox-1,4-dien-3-one, is recrystallized from heptane and has a melting point of 158–159° C.

Using 6,7α-chlorofluoromethylene-20-spirox-4-en-3-one and 6,7α - dichloromethylene - 20-spirox-4-en-3-one prepared as in Examples 1 or 12, treatment with 2,3-dichloro-5,6-dicyanobenzoquinone in an analogous procedure results in the products 6,7α-chlorofluoromethylene-20-spirox-1,4-dien-3-one and 6,7α - dichloromethylene - 20-spirox-1,4-dien-3-one, respectively.

EXAMPLE 3

1,2α-methylene-6,7α-difluoromethylene-20-spirox-4-en-3-one

A solution of Corey reagent is prepared by adding 2.20 mg. of trimethylsulfoxonium iodide to a suspension of sodium hydride (40 mg. of a 55% dispersion in mineral oil) in 2 ml. of dimethylsulfoxide. The addition is made at room temperature under nitrogen flow. After one hour, the mixture becomes clear. 100 mg. of 6,7α-difluoromethylene - 20 - spirox - 1,4 - dien-3-one prepared as in Example 2, is dissolved in 2 ml. of dimethylsulfoxide. It is added to the Corey reagent, and allowed to react overnight.

The reaction mixture is quenched by addition of about 20 ml. of water. The product immediately precipitates out. It is filtered and washed well with water. The product is purified by passing through a column packed with 100:1 silica gel. The first elution is with benzene, then with 5% ether in benzene. 77.8 mg. of 1,2α-methylene-6,7α-difluoromethylene-20-spirox-4-en-3-one is obtained. It is recrystallized first with hexane, then with ether and petroleum ether. The melting point is 156–158° C.

Using 6,7α-chlorofluoromethylene-20-spirox-1,4-dien-3-one and 6,7α-dichloromethylene-20-spirox-1,4-dien-3-one prepared as in Example 2, treatment with Corey reagent in an analogous procedure results in the products 1,2α-methylene-6,7α-chlorofluoromethylene - 20 - spirox-4-en-3-one and 1,2α-methylene-6,7α-dichloromethylene-20-spirox-4-en-3-one, respectively.

EXAMPLE 4

3-hydroxy-20-spiroxa-4,6-diene 2.0 gm. of 20-spiroxa-4,6-dien-3-one is dissolved in 25 cc. of methanol and cooled to −15° C. in a methanol-ice bath with stirring. 1.0 gm. of sodium borohydride is added in small portions and the mixture allowed to stir for 2 hours while keeping the temperature below 0° C. After 2 hours, 4 cc. of glacial acetic acid is added and the reaction mixture is diluted with 100 cc. of water. The mixture is concentrated under reduced pressure on a water bath, then diluted with water and allowed to crystallize. It is then filtered, washed with water, and pumped dry. Following recrystallization from methanol and purification using thin-layer chromatography, 3-hydroxy-20-spiroxa-4,6-diene, is recovered.

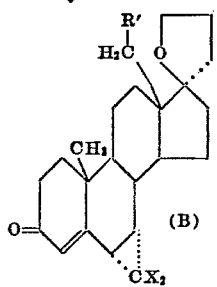

The above processes describe the preparation of spiroxenones having a simple ether moiety in the spiroxaring (i.e., R is a —CH$_2$— group). The scope of this invention also encompasses compounds having a corresponding spirolactone moiety. These compounds are also described within the ambit of Formula I, when R represents a

group. These compounds of Formula I are prepared using a slightly different process, as outlined in Flow Sheet 3.

The starting material for the process outlined in Flow Sheet 3 is 17α-(3-hydroxypropyl)-17β-hydroxyandrost-4-en-3-one (Compound K). This compound is reacted with an alkylorthoformate and an alcohol such as methanol or ethanol, in the presence of a mineral acid to form the 3-alkoxy-3,5-diene group. Methylorthoformate and ethylorthoformate are the preferred reagents although any one of the 1–6 loweralkyl groups can be used. This process results in the preparation of Compound L. The latter is then treated with chloronil at reflux in an inert solvent which serves to dehydrogenate the compound and remove the alkyl group, thereby preparing Compound M. The latter is then 6,7α-dihalomethylated using the desired trihalosodium acetate as described in Flow Sheet 1. The resultant compound is Compound N.

FLOW SHEET 3

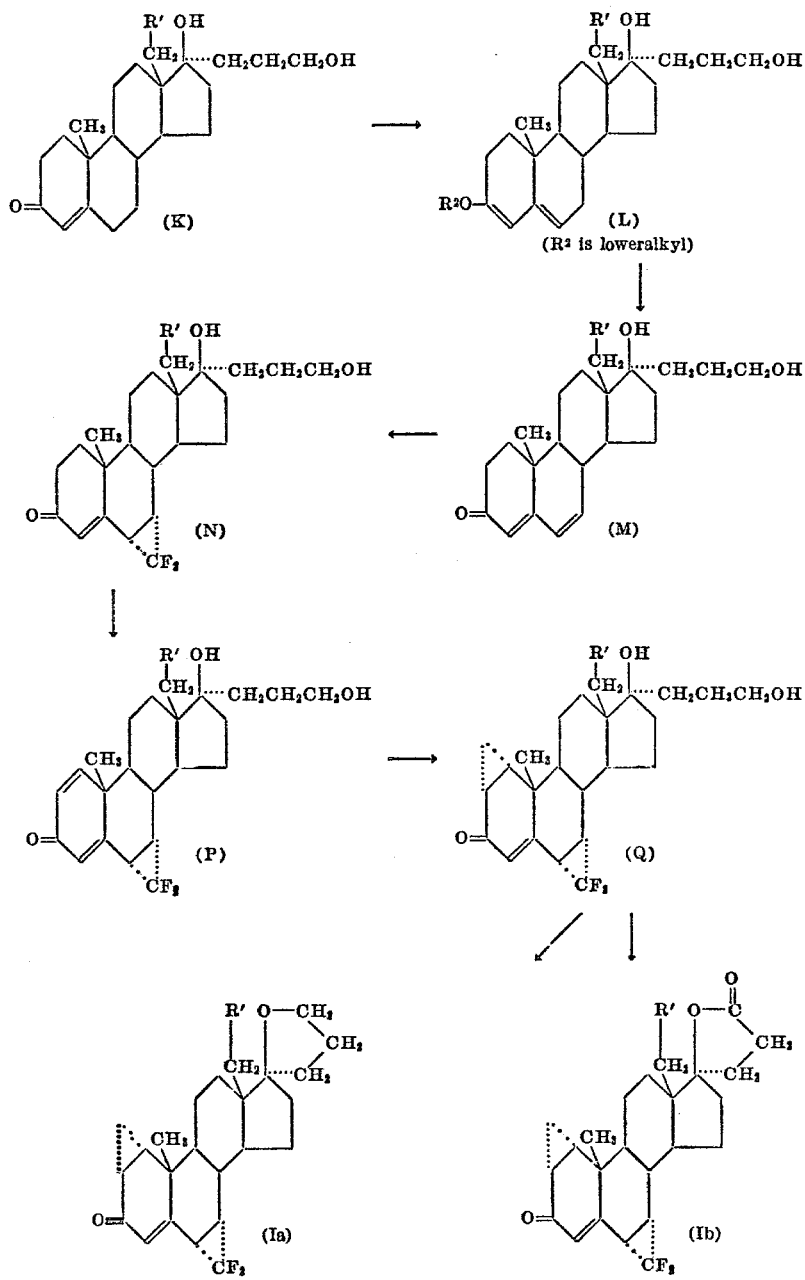

EXAMPLE 5

3-acetoxy-20-spiroxa-4,6-diene

Using the 3-hydroxy-20-spiroxa-4,6-diene prepared following the procedure of Example 4, 1.523 gm. of the steroid is dissolved in 8.3 cc. of pyridine by warming on a steam bath. 4 cc. of acetic anhydride is added and the solution is warmed on a steam bath for 10 minutes. The reaction mixture is poured into 100 cc. of ice and white crystals separated. The crystals are filtered off, washed thoroughly with $H_2O$ and pumped dry. The product, 3-acetoxy-20-spiroxa-4,6-diene, is recovered after purification by crystallization from methanol.

EXAMPLE 6

3-acetoxy-6,7α-dichloromethylene-20-spiroxa-4-ene

Using the 3-acetoxy-20-spirox-4,6-diene prepared following the procedure of Example 5, 200 mg. of the steroid and 210 mg. of phenyl trichloromethyl mercury are dissolved in 5 cc. of benzene and heated at reflux with stirring under nitrogen for 67 hours.

The reaction mixture is then cooled and filtered. The precipitate is phenyl mercuric chloride. The filtrate is evaporated to dryness, and is a yellow oil. After purification using thin-layer chromatography, a clear oil is recovered and crystallized from methanol. The crystalline product is identified as 3-acetoxy-6,7α-dichloromethylene-20-spirox-4-ene, having a melting point of 152–155° C.

EXAMPLE 7

3-hydroxy-6,7α-dichloromethylene-20-spirox-4-ene

Using the 3-acetoxy-6,7α-dichloromethylene-20-spirox-4-ene prepared following the procedure of Example 6, 25 mg. of steroid is dissolved in 2.15 cc. of methanol and added to a solution of 0.11 cc. of water containing 21.5 mg. of potassium carbonate. This mixture is heated at reflux for one hour. It is then cooled and diluted with water. The excess methanol is evaporated under reduced pressure. The crude product is separated by filtration and pumped dry. Thin-layer chromatography purification results in the recovery of 3-hydroxy-6,7α-dichloromethylene-20-spirox-4-ene, having a melting point of 118–120° C.

EXAMPLE 8

6,7α-dichloromethylene-20-spirox-4-en-3-one

Following the procedure of Example 7, 3-hydroxy-6,7α-dichloromethylene-20-spirox-4-ene is prepared. 500 mg. of the steroid is dissolved in 75 cc. of chloroform. 5.0 gm. of manganese dioxide is added and the mixture stirred for one hour at room temperature. It is filtered then washed several times with chloroform. After evaporation to a clear oil, and recrystallization, 6,7α-dichloromethylene-20-spirox-4-en-3-one is recovered having a melting point of 151–153° C.

This product is identical to that prepared following the procedure of Example 1, and can then be treated to prepare 6,7α-dichloromethylene-20-spiroxa-1,4-dien-3-one following the process of Example 2. The latter compound can be used in the process described in Example 3 to prepare 1,2α-methylene - 6,7α - dichloromethylene-20-spirox-4-en-3-one.

EXAMPLE 9

17α-(3-hydroxypropyl)-17β-hydroxyandrosta-4,6-dien-3-one

To one g. of 17α-(3-hydroxypropyl)-17β-hydroxyandrost-4-en-3-one (A) in 10 ml. of dry ethanol is added 1.5 ml. of ethyl orthoformate and one g. of toluene-sulfonic acid. The mixture is stirred briefly at room temperature and then diluted with water to give the crude 3-ethoxy-3,5-diene. This on treatment with N-bromosuccinimide in 30 ml. of 5% aqueous dioxane containing 3 ml. of glacial acetic acid gives the 6-bromo compound which when heated at 90° C. for several hours with 0.5 g. of lithium bromide and 0.4 g. of lithium carbonate in 10 ml. of dimethylformamide under nitrogen gives 70% of the diene, 17α-(3-hydroxypropyl)-17β-hydroxyandrosta-4,6-dien-3-one. The product is not characterized further, but used in the next example.

EXAMPLE 10

6,7α-difluoromethylene-17α-(3-hydroxypropyl)-17β-hydroxyandrost-4-en-3-one

One gram of the 4,6-diene product of Example 9 dissolved in 5 ml. of triglyme is heated to 200° C. and treated dropwise over one hour at about 200° C. with a solution of 5 g. of sodium chlorodifluoro acetate in 50 ml. of the same solvent. The mixture is cooled and quenched into ice and extracted with ethyl acetate. Drying and concentration gives the crude 6,7α-difluoromethylene derivative. Recrystallization from acetone:hexane gives the purified compound, 6,7α-difluoromethylene-17α-(3-hydroxypropyl)-17β-hydroxyandrost-4-en-3-one; it is used without further characterization in the next example.

EXAMPLE 11

6,7α-difluoromethylene-17α-(3-hydroxypropyl)-17β-hydroxyandrost-1,4-dien-3-one One gram of the difluoromethylene derivative prepared in Example 10 is heated in 15 ml. of benzene with 0.95 g. of 2,3 - dichloro - 5,6 - dicyanobenzoquinone at reflux under nitrogen for two hours. The by-product hydroquinone is filtered and the product diene further purified (60% yield) by elution chromatography on silica gel with methanol-chloroform mixtures. It is identified as 6,7α-difluoromethylene - 17α - (3 - hydroxypropyl)-17β-hydroxyandrost - 1,4 - dien-3-one, and used directly in the next example.

EXAMPLE 12

1,2α-methylene-6,7α-difluoromethylene-17α-(3-hydroxypropyl)-17β-hydroxyandrost-4-en-3-one Two grams of the dien-one prepared in Example 11 is treated with the Corey reagent, as in Example 3. Recrystallization of the crude product from methanol gives a yield of 75% of 1,2α-methylene-6,7α-difluoromethylene-17α - (3 - hydroxypropyl) - 17β-hydroxyandrost-4-en-3-one, M.P. 168–169° C. IR and UV analysis show peaks consistent with this structure.

EXAMPLE 13

1,2α-methylene-6,7α-difluoromethylene-20-spirox-4-en-3-one (Ia)

A solution of 750 mg. of the dimethylene steroid prepared in Example 12 in 15 ml. of pyridine is treated with 1.05 equivalents of p-toluenesulfonyl chloride overnight at room temperature. Dilution of the mixture with benzene, washing with bicarbonate and then water gives the crude spiro compound. Recrystallization from hexane and then ether-petroleum ether gives pure Ia, 1,2α-methylene-6,7α-difluoromethylene - 2 - spirox - 4 - en-3-one (80% yield), M.P. 158–159° C., having IR and UV peaks as predicted by the structural formula.

EXAMPLE 14

1,2α-methylene-6,7α-difluoromethylene-20-spiroxa-4-en-3,21-diene (Ib)

A solution of 750 mg. of the dimethylene derivative of Example 121 in 100 ml. of acetone is treated with 0.60 mg. of 8 N chromic acid solution at 10° C. with stirring. After 10 minutes, the mixture is diluted with chloroform and washed. Drying and concentration in vacuo gives the crude spiro lactone. Recrystallization from ether-petroleum ether yields pure (75% yield) 1,2α-methylene-6,7α- difluoromethylene - 20 - spiroxa - 4 - en-3,21-dione, M.P. 183-185° C. Molecular weight analysis, IR and UV analysis indicates that the structural formula is correct.

EXAMPLE 15

1,2α-methylene-6,7α-difluoromethylene-20-spirox-4-en-3-ol-21-one 72 mg. of 1,2α - methylene - 6,7α-difluoromethylene-20-spirox-4-en-3,21-dione, as prepared in Example 14, is dissolved in 12 ml. of isopropyl alcohol. 40 mg. of sodium borohydride are added, and the mixture left under nitrogen at room temperature for 7 days.

The mixture is then added to a saturated solution of potassium dihydrogen phosphate, and the product extracted with ether. The crude extract is dissolved in 5 ml. of isopropyl alcohol and 10 ml. of a saturated solution of potassium dihydrogen phosphate are added, and the mixture heated to reflux for 30 minutes. The mixture is again extracted with ether. After purification using chromatographic techniques, 1,2α - methylene - 6,7α - difluoromethylene - 20 - spirox - 4 - en-3-ol-21-one is recovered (45% yield), M.P. 218-221° C.

EXAMPLE 16

1,2α-methylene-3-acetoxy-6,7α-difluoromethylene-20-spirox-4-en-21-one 40 mg. of 1,2α-methylene-6,7α-difluoromethylene-20-spirox-4-en-3-ol obtained in Example 15 is dissolved in 0.5 ml. of pyridine, and 0.5 ml. of acetic anhydride added. The mixture is permitted to stand at room temperature overnight. Water is then added, and the product extracted with ether. It is passed through a column packed with 50:1 silica gel, and the product eluted with benzene.

The final product is identified as 1,2α-methylene-3-acetoxy-6,7α-difluoromethylene-20-spirox-4-en-21-one; the yield is about 55%. The product could not be recrystallized and has a melting point of 79-80° C.

EXAMPLE 17

Sodium 1,2α-methylene-6,7α-difluoromethylene-17α-propionate-17β-hydroxyandrost-4-en-3-one 300 mg. of the lactone prepared as in Example 14 is dissolved in 7.2 ml. of ethanol. 8.0 ml. of 0.09 N sodium hydroxide are added. The whole mixture is kept under an inert atmosphere (nitrogen) for 3½ hours. A thin-layer chromatography check shows little signs of the starting material. The mixture is then concentrated under vacuum. Water is added to the reaction mixture. The mixture is extracted with ether. The aqueous solution containing the salt is then freeze-dried. The solid obtained has a M.P. of 195-196° C. with decomposition. The angle of rotation is $+142.6 \pm 1.4$, and UV analysis shows $\lambda_{max}$ 245 E% 227 in methanol. These results, as well as elemental analysis, indicates the product is sodium 1,2α-methylene - 6,7α - difluoromethylene-17α-propionate-17β-hydroxyandrost-4-en-3-one.

The free acid can be easily prepared by adding acid to the aqueous solution above. Suitable acids include hydrochloric, dilute sulfuric, and the like.

The potassium salt can be prepared in an analogous manner.

What is claimed is:

1. The compound of the formula:

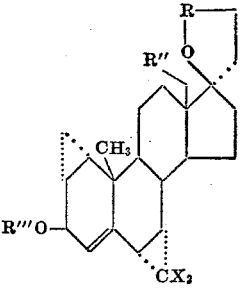

wherein R is methylene (—CH₂—) or keto $$\left( \begin{matrix} O \\ \| \\ -C- \end{matrix} \right)$$

and R" is hydrogen, and X is chloro or fluoro.

2. The compound of claim 1 which is 1,2α-methylene-6,7α-difluoromethylene-20-spirox-4-en-3-one.

3. The compound of claim 1 which is 1,2α-methylene-6,7α-difluoromethylene-20-spirox-4-en-3,21-dione.

4. The compound of the formula:

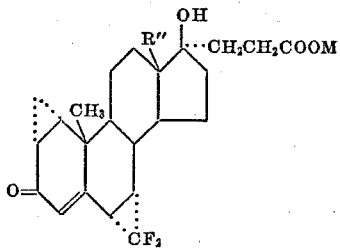

wherein R is methylene or keto, R" is hydrogen and R'" is hydrogen or loweralkanoyl having 1-6 carbon atoms, and X is chloro or fluoro.

5. The compound of the formula:

![structure]

wherein R" is hydrogen; and M is hydrogen, sodium, or potassium.

References Cited
UNITED STATES PATENTS

| | | | |
|---|---|---|---|
| 3,068,229 | 12/1962 | Camerino et al. | 260—239.57 |
| 3,107,241 | 10/1963 | Baran | 260—239.57 |
| 3,338,928 | 8/1967 | Beard et al. | 260—397.4 |
| 3,356,677 | 12/1967 | Beard et al. | 260—239.55 |
| 3,424,750 | 1/1969 | Fried | 260—239.55 |

HENRY A. FRENCH, Primary Examiner

U.S. Cl. X.R.

260—239.57, 397.1, 397.4, 397.5, 999